July 18, 1933.  G. W. WOODS  1,918,949
WELL STRAINER
Filed Oct. 5, 1931    2 Sheets-Sheet 1

GORHAM W. WOODS INVENTOR
BY *Jesse R. Stone*
ATTORNEY

July 18, 1933.  G. W. WOODS  1,918,949
WELL STRAINER
Filed Oct. 5, 1931  2 Sheets-Sheet 2

GORHAM W. WOODS INVENTOR

BY Jesse R. Stone
ATTORNEY

Patented July 18, 1933

1,918,949

UNITED STATES PATENT OFFICE

GORHAM W. WOODS, OF HOUSTON, TEXAS, ASSIGNOR TO HUGHES TOOL COMPANY, OF HOUSTON, TEXAS, A CORPORATION OF TEXAS

WELL STRAINER

Application filed October 5, 1931. Serial No. 566,855.

My invention relates to well strainers such as are employed in equipping deep oil, gas or water wells to filter foreign material such as sand and sediment from the fluid produced by the well.

I have as an object to provide a strainer having a maximum of straining area so as to allow the fluid to pass more effectively.

I have as a further object the forming of a strainer of cheap and economical construction whereby the cost to the consumer may be decreased.

I desire to form a strong and durable device in which the sizes of the straining openings may be varied readily to suit the type of formation in which the device is used.

In the drawings herewith Fig. 1 is a side view, partly in central vertical section, of a strainer embodying my invention.

Figure 1:
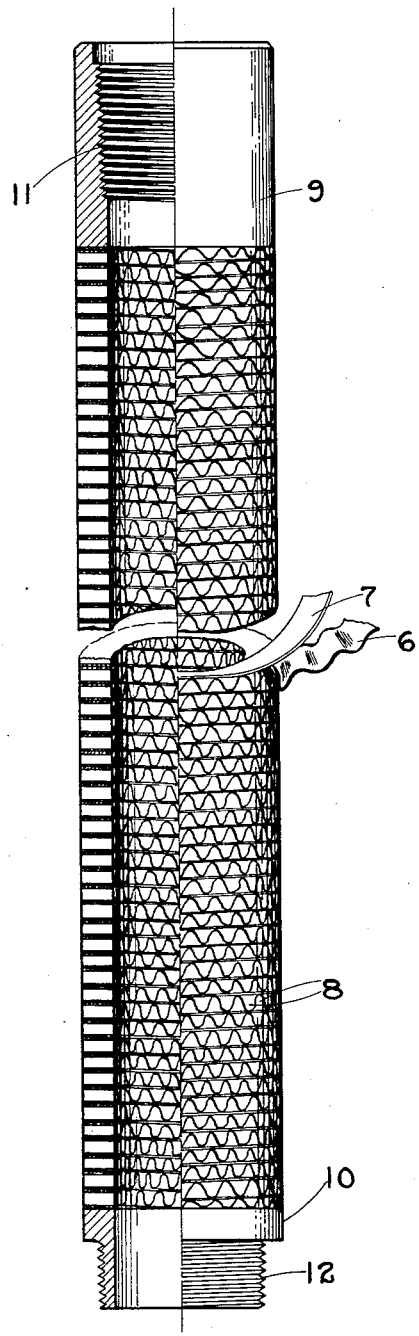
Figure 2:
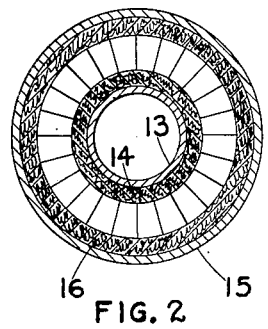
Fig. 2 is a transverse section of the strainer shown in Fig. 1.
Figure 3:
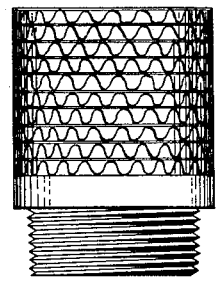
Fig. 3 is a detail showing the lower end of the strainer in elevation.

In Figs. 1 to 3, the body of the strainer is made up of ribbon shaped strips of sheet metal, such as nickel, not easily corroded and resistant to abrasion. I employ alternate strips or layers of this material. One strip 6 is crimped or transversely corrugated and the adjacent strip 7 is a plane flat strip. These layers may be circular plates, but I prefer to wind the strips spirally around a mandrel of the proper size, said mandrel being shown at 13 in Fig. 2. I thus form a helix in which the corrugated strip forms straining openings 8 through which fluid may pass. At the upper and lower ends I place collars 9 and 10 respectively one of which is internally threaded at 11, while the other is externally threaded at 12. Thus the assembled strainer section may be connected in the line of casing.

The adjacent layers of ribbon may be secured together by welding or other well known methods, or I may secure the ribbons together and also secure the collars to the straining wall by heating in the presence of hydrogen.

In securing the parts together by heating, I employ an inner tubular mandrel 13 of iron or steel and surround the same with a layer of noncombustible material such as asbestos indicated at 14 in Fig. 2. About this core the layers of ribbon are wound and the collars 9 and 10 are set in position. An outer sleeve 15 of iron or steel, lined with a layer of asbestos 16 is then placed over the assembled strainer and the assembly is ready for heat treatment.

The iron pipes 13 and 15 are treated before this use by boiling in hydrochloric acid or the like until a large amount of hydrogen is absorbed. Thereafter, when the strainer is baked at a temperature ranging about 1800° F. for about 20 hours, the hydrogen is released and assists in preventing oxidation; and the metal parts will form a bond at all contacting points so as to result in an integral strainer with what appear to be welds at the points of contact. Although the temperature is below the point of fusion of iron or nickel the parts appear to be fused together where they contact with other metal.

Figure 4:
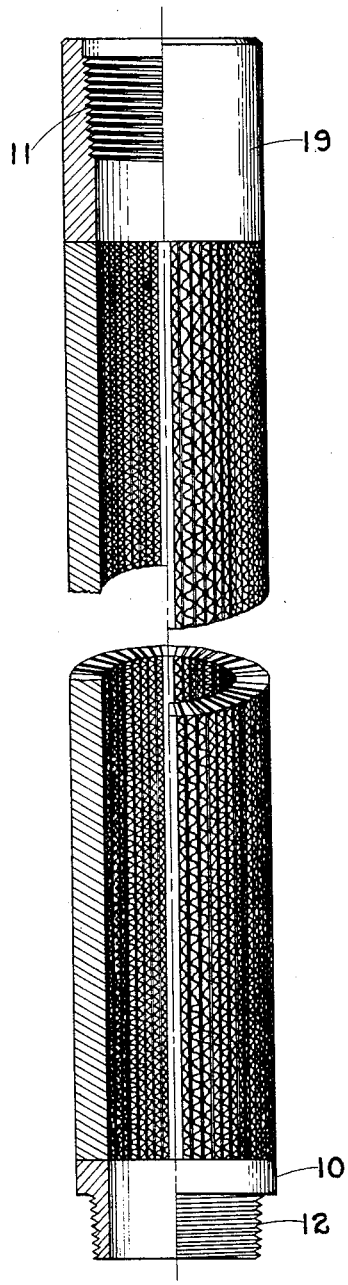
Fig. 4 is a view similar to Fig. 1 but illustrating a different form of the invention.
Figure 6:
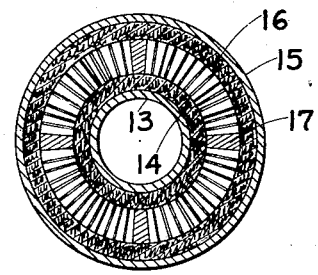
Fig. 6 is a transverse section of this type of construction.
Figure 5:
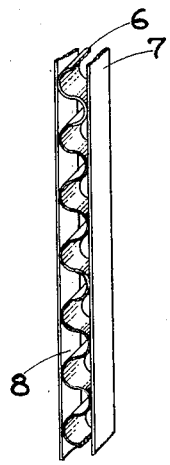
Fig. 5 is a broken perspective detail of the construction employed in the Fig. 4 embodiment.

In Figs. 4 to 6, the construction is varied by running the ribbons longitudinally of the wall of the strainer. As will be seen from Fig. 5, the crimped strip 6 is placed between alternate strips 7 which are plane. I cut these strips the length of the strainer wall desired and place them about the mandrel as in the previous embodiment to form a strainer tube of the desired diameter. The strips are preferably radial, as seen in Fig. 6, and I may employ reinforcing and spacing strips 17 at intervals around the wall as will be clear from Fig. 6.

This strainer will be secured together in the manner previously described relative to the first embodiment with collars at each end as shown in Fig. 4.

A strainer formed in this manner may be varied as to the sizes of the openings 8 by the pitch of the corrugations in the ribbon 6 in an obvious manner. Also it will be possible to make the strainer pipe of various diameters by the use of mandrels 13 of the desired diameters. The strainer will have a foraminated wall which is open to the passage of fluid throughout its exposed area.

It will be clear that a strainer of this construction will be comparatively cheap to make and will be efficient in use due to its large straining area.

What I claim as new is:

1. A well strainer having a cylindrical straining wall made up of alternate flat and transversely corrugated strips of sheet metal secured together, and connecting collars formed thereon at each end.

2. A hollow cylindrical well strainer comprising end couplings, longitudinal strips of sheet metal connecting said couplings, said strips being alternately transversely corrugated and flat and bonded integrally to each other and to said couplings.

3. A hollow cylindrical well strainer comprising end couplings, longitudinal strips of sheet metal connecting said couplings, said strips being alternately transversely corrugated and flat and bonded to each other and to said couplings, and reinforcing rods spaced at intervals between said couplings.

GORHAM W. WOODS.